Figure 1:
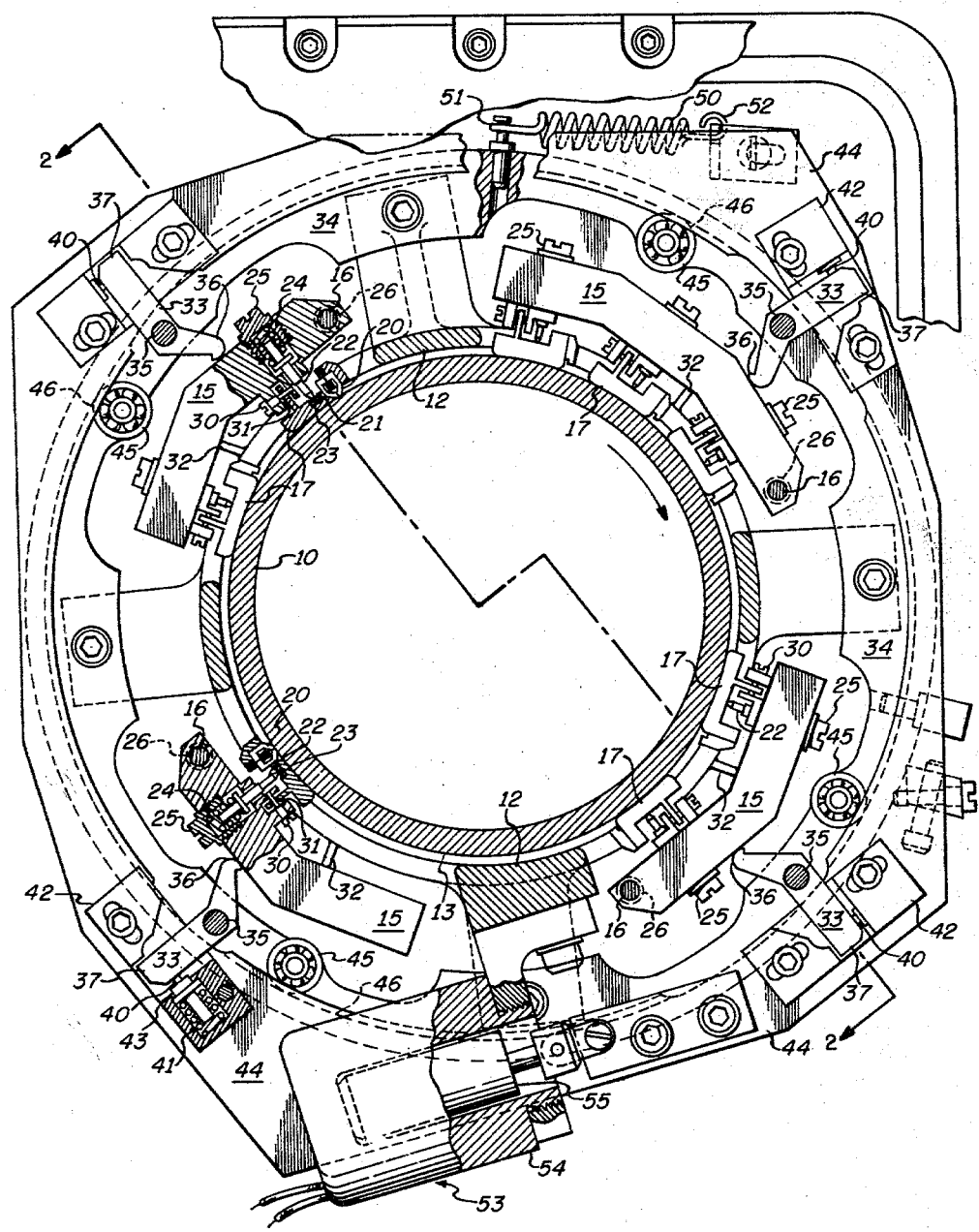

TO SPEED AND
DIRECTION SENSING
MEANS 56

INVENTORS
FRED H. BARGETZI
CLARENCE A. MULLER
BY
ATTORNEY

United States Patent Office 3,173,997
Patented Mar. 16, 1965

3,173,997
TRANSDUCER SUPPORT APPARATUS FOR
MAGNETIC RECORDER
Fred H. Bargetzi, Huntington, and Clarence A. Muller, Northport, N.Y., assignors to Sperry Rand Corporation, Great Neck, N.Y., a corporation of Delaware
Filed Feb. 16, 1962, Ser. No. 173,772
3 Claims. (Cl. 179—100.2)

This invention relates to a magnetic recorder for recording and reproducing electrical signals. It is particularly adaptable to recorders of the type used in computers.

One of the primary problems in apparatus of this type is to obtain high resolution of the electrical signals. The smaller the spacing between the recording and reading heads and the magnetic drum the better the resolution. The problem then involves establishing the head at a very small distance from the drum and maintaining the spaced relationship precisely during operation. When it is realized that this distance is in the order of .0001 inch, it will be appreciated that the problem of maintaining this distance constant during operation is extremely difficult. Although it is difficult to do this when the drum is supported for rotation by ball bearings, it becomes considerably more difficult when the drum is hydrodynamically supported for rotation by means of an air bearing since the position of the longitudinal axis of the drum during rotation does not coincide with its position at rest.

Further a rotating magnetic recorder processes under angular velocities much the same as a gyro. Conventional bearings become unevenly loaded under these circumstances and uneven deflection occurs, interfering with the uniformly spaced relationship between the heads and the rotating drum. If the device is carried in an aircraft, acceleration may cause uneven bearing deflection. A self-lubricated air bearing, or viscous shear air bearing, as used herein, permits a minimum of deflection and acts to maintain an evenly spaced relationship between the heads and the drum.

Another problem is to prevent scoring or damage to the magnetic drum surface when the drum begins to rotate. In certain devices the head is permitted to rest on the drum until the drum has achieved sufficient speed to create an air bearing film between the head and the drum. This unnecessarily damages the magnetic surface of the drum.

It is a primary object of the present invention to provide a magnetic recorder having high resolution.

It is a further object of the present invention to provide a magnetic recorder having positionable heads which are disposed remote from the drum during the beginning of rotation of the drum and maintain accurate spacing therefrom during operation.

A further object of the present invention is to provide a magnetic recorder in which the resolution of the electrical signals is substantially unaffected by accelerations experienced by the recorder.

A further object of the present invention is to provide a magnetic recorder in which the recording head will follow the surface of the recording medium at a sufficiently close distance to permit high packing factors and at a constant distance from the recording medium to preclude modulation by variation of the air gap between the recording head and the recording medium.

Another object of the invention is to provide a magnetic recorder in which the wear of the recording medium is eliminated.

Still another object of the invention is to provide a transducer head means of such compliance in suspension as to permit said head means to follow variations in the surface of the recording medium.

An additional object of the present invention is to provide a magnetic recorder that is economical to manufacture and permits greater machining tolerances.

The above objects are achieved in the present invention by providing means for positioning the recording and reading heads of a magnetic recorder remote from the magnetic surface until the drum reaches a predetermined speed capable of developing an air bearing film. When the drum reaches the predetermined speed, the heads are positioned adjacent the drum surface in order that the spinning drum creates an air film between the surface of the drum and the heads which acts as an air bearing. The heads are resiliently mounted in order that the air film acts against the resilient force thereby maintaining the heads in a precise spaced relationship with respect to the rotating drum surface. In this manner high resolution of the electrical signals is achieved while scoring of the drum surface is prevented.

Figure 2:
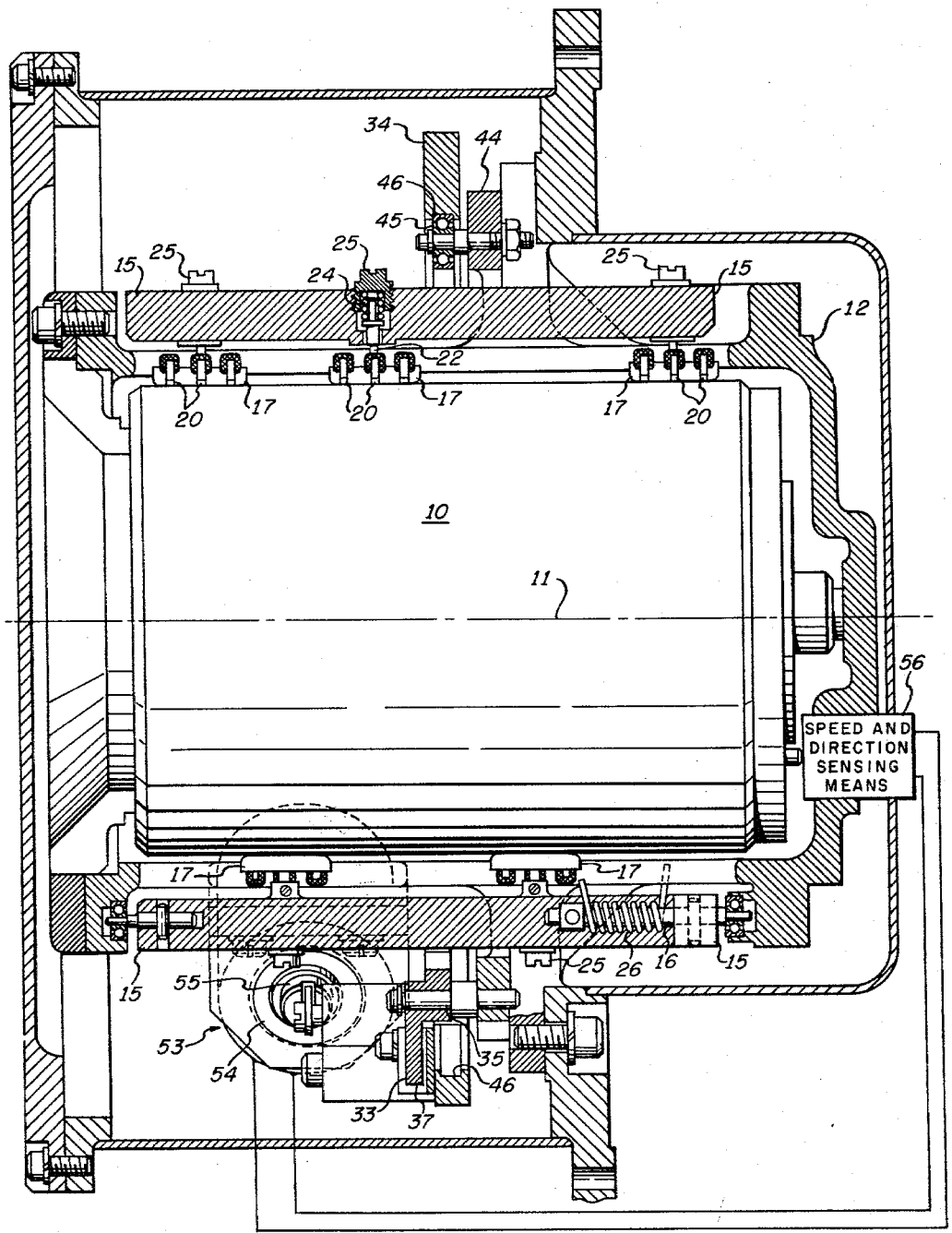

Referring to the drawings,

FIG. 1 is a side view partly in section of a magnetic recorder incorporating the present invention; and FIG. 2 is a view partly in section taken along lines 2—2 of FIG. 1.

Referring to the drawings, a cylindrical drum 10 is hydrodynamically supported for rotation on an air bearing about its longitudinal axis 11 within a drum housing 12. The drum 10 has a magnetic recording coating 13 on its outer cylindrical surface. A plurality of lid members 15 are pivotally mounted on the drum housing 12 around the periphery of the drum 10 and pivot about their respective pivots 16. Each of the lids 15 supports one or more shoes 17.

Each of the shoes 17 includes at least one read and record head 20. Each of the shoes 17 is aerodynamically constructed and arranged that with the drum 10 rotating in the proper direction and at a predetermined speed, an air film is formed between the drum 10 and the shoe 17 thereby forming a self-lubricating air bearing therebetween. For purposes of simplicity, the structure of one typical shoe 17 will be described. The shoe 17 is universally pivoted about a point 21 by means of a pivot pin 22 that cooperates with a jewel bearing 23 in the shoe 17. The pivot pin 22 is resiliently urged radially inward towards the drum 10 by means of a helical spring 24 mounted in an opening within the lid 15. The spring force on the pivot pin 22 is adjusted by means of an adjusting screw 25.

To prevent scoring of the recording surface 13 when the drum 10 is not up to its predetermined operating speed, the lid 15 is spring biased outwardly by means of a helical spring 26 wrapped around the pivot 16. The spring 26 continuously urges the lid 15 in a clockwise direction as viewed in the drawings around the pivot 16. In order to retract the shoe 17 when the drum 10 is not up to speed, the shoe 17 is loosely connected to the lid 15 by means of a screw 30 in the lid 15 extending through an elongated slot 31 in an extension of the shoe 17. This arrangement provides for retraction of the shoe 17 while permitting universal movement of the shoe 17 at the operating speed of the drum 10. The lid 15 is prevented from rotating counterclockwise as viewed in the drawing beyond a predetermined point by means of an adjustable stop member 32 mounted in the drum housing 12 and cooperative with an extremity of the lid 15 remote from the pivot 16.

The lid 15 is positioned in a counterclockwise direction against the resilient force of the spring 26 by means of a cam 33. The cam 33 is pivotally mounted on a stationary ring 34 by a pivot 35. The stationary ring 34 is mounted on an extension of the drum housing 12 and circumscribes it. One extremity 36 of the cam 33 is cooperative with the lid 15 while the other extremity 37 of the cam 33 is cooperative with a spring biased contact 40. The contact 40 is spring biased by means of a helical spring 41 in a direction which urges it towards the extremity 37 of the cam 33 but the contact 40 is prevented from extending more than a predetermined distance beyond its housing 42 by means of a shoulder 43. The housing 42 containing the contact 40 is mounted on a rotatable ring 44 which circumscribes the stationary ring 34. The ring 44 is mounted for rotation on the stationary ring 34 by means of a plurality of ball bearing guides 45 that are cooperative with a slot 46 in the rotating ring 44.

The rotatable ring 44 is continuously resiliently biased in a counterclockwise direction by means of a helical retraction spring 50 which has one end 51 connected to the stationary ring 34 and its other end 52 connected to the rotatable ring 44. In this manner the rotatable ring 44 is held in a position by means of the spring 50 whereby the contacts 40 do not abut against the respective extremities 37 of the cams 33 thereby permitting the lids 15 to be retracted by means of the springs 26. This holds the shoes 17 away from the recording surface 13 of the drum 10 below the predetermined speed.

A solenoid 53 has its housing 54 mounted on an extension of the drum housing 12 while its plunger 55 is connected to the rotatable ring 44. In its unenergized condition, the plunger 55 is in its uppermost position with the spring 50 holding the rotatable ring 44 in its furthermost counterclockwise position. When the solenoid 53 is energized, its plunger 55 is attracted to its lowermost position thereby rotating the ring 44 in a clockwise direction. The solenoid 53 is energized by speed and direction sensing means 56. The speed and direction sensing means 56 is responsive to the speed and direction of rotation of the drum 10 and provides a signal to energize the solenoid 53 when the drum 10 is rotating in the proper direction and at a predetermined speed sufficient to form the air bearing between the drum 10 and the shoes 17. The shoes 17 float on the air film thus created.

In operation, before the drum 10 begins to rotate, the heads 20 mounted on the respective shoes 17 are held in a retracted position away from the recording surface 13 of the drum 10 by the respective springs 26. The cams 33 are ineffective at this time because the retraction spring 50 maintains the rotatable ring 44 in its furthermost counterclockwise position as viewed in the drawings. Thus, the cams 33 freely pivot about their respective pivots 35 and provide no force against the lids 15. The shoes 17 are retracted by their respective screws 30 in the lids 15.

As the drum 10 accelerates to its predetermined operating speed rotating in the proper direction, the speed and direction sensing means 56 provides a signal to energize the solenoid 53 which causes the rotatable ring 44 to rotate in a clockwise direction as viewed in the drawings. The contacts 40 abut against the respective extremities 37 of the cams 33 causing the cams 33 to pivot clockwise and apply a force through their respective extremities 36 to the lids 15.

The lids 15 are pivoted in a counterclockwise direction until they contact their respective stop members 32. Since all of the lids 15 may not contact their respective stop members 32 at exactly the same time, the contacts 40 are resiliently mounted by means of the springs 41. The contacts 40 thus continue to apply a resilient force to the cams 33 while permitting additional movement of the rotatable ring 44 until all of the lids 15 contact their respective stops 32. By this arrangement any dimensional inaccuracies between the respective elements are automatically compensated. It will be appreciated that this eliminates the necessity of maintaining extremely close machining tolerances which for the accuracies involved would otherwise be extremely expensive.

With the lids 15 contacting their respective stop members 32, the shoes 17 are disposed adjacent the recording surface 13 and they are resiliently urged radially inward by means of the respective springs 24. The shoes 17 are urged radially outward by the lift created by the air film due to the rapidly rotating magnetic drum 10. The shoes 17 are aero-dynamically designed and universally pivoted to maintain a position above the recording surface 13 in which the resilient force of each of the springs 24 is balanced by the lift created by the air film. This maintains the shoes 17 and thus the recording heads 20 in a predetermined precisely spaced relation with respect to the recording surface 13 that is accurately and continuously maintained during the operation of the drum 10. Furthermore, this arrangement precludes any possibility of scoring the recording surface 13.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a magnetic recorder, a drum housing, a cylindrical drum having a recording surface mounted on said housing for rotation about its longitudinal axis, transducer head means, at least one lid member pivotally mounted on said housing for resiliently supporting said transducer head means, said transducer head means being resiliently urged in a direction towards said drum, first resilient means for resiliently urging said lid member in a direction away from said drum, a ring member rotatably mounted on and circumscribing said housing, cam means pivotally mounted on said housing and cooperative with said lid and ring members for positioning said lid members, second resilient means connected to said housing and said ring member for resiliently urging said ring in a direction whereby said lid members are disposed remote from said drum, solenoid means mounted on said housing having one portion connected to said ring for positioning said ring member in a direction opposite to that urged by said second resilient means whereby said lid members are disposed adjacent said drum, speed and direction sensing means responsive to the movement of said drum for energizing said solenoid means to cause said transducer head means to move from said remote position to a position adjacent said drum when said drum is rotating in a predetermined direction and above a predetermined speed, and means for rotating said drum thereby developing a self-lubricating fluid film between said drum and said transducer head means.

2. In a magnetic recorder, a drum housing, a cylindrical drum having a recording surface mounted on said housing for rotation about its longitudinal axis, a plurality of transducer head means, a plurality of lids pivotally mounted on said housing around the periphery of said recording surface, each of said lids resiliently supporting at least one transducer head means, said transducer head means being resiliently urged in a direction towards said drum, each of said lid members being spring biased in directions radially outward from said drum, a common ring member encircling said housing and rotatably mounted thereon, a plurality of cam members pivotally mounted on said housing, each of said cam members being cooperative with a respective lid and said common ring for simultaneously positioning said lids, a retraction spring connected to said housing and said common ring for resiliently urging said ring in a direction whereby said lids are disposed radially outward from said drum, a solenoid mounted on said housing and having one portion connected to said ring for rotating said ring in a direction opposing said retraction spring force, speed and direction sensing means responsive to the movement of said drum for energizing said solenoid means to cause said transducer head means to move from said remote means to a position adjacent said drum when said drum is rotating in a predetermined direction and above a predetermined speed, and means for rotating said drum thereby developing a self-lubricating fluid film between said drum and said transducer head means.

3. In a magnetic recorder as described in claim 2 further including stop means cooperative with said lids which prevent rotation of said lids in a direction towards said drum beyond a predetermined point and a plurality of contact members mounted on said common ring and adapted to engage respective cam members, said contact members being resiliently mounted on said common ring for applying a resilient force in a direction tending to maintain said lids against their respective stop members thereby positioning each of said lids at the same distance from the drum in spite of dimensional differences therebetween tending to cause variations in the positions of said lids.

References Cited by the Examiner
UNITED STATES PATENTS
2,862,781   12/58   Baumeister _____ 179—100.2 X IRVING L. SRAGOW, *Primary Examiner.*